(12) United States Patent
Kato

(10) Patent No.: US 10,664,947 B2
(45) Date of Patent: May 26, 2020

(54) IMAGE PROCESSING APPARATUS AND IMAGE PROCESSING METHOD TO REPRESENT PART OF SPHERICAL IMAGE IN PLANAR IMAGE USING EQUIDISTANT CYLINDRICAL PROJECTION

(71) Applicant: CANON KABUSHIKI KAISHA, Tokyo (JP)

(72) Inventor: Yuji Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/007,323

(22) Filed: Jun. 13, 2018

(65) Prior Publication Data

US 2019/0005609 A1 Jan. 3, 2019

(30) Foreign Application Priority Data

Jun. 30, 2017 (JP) .................................. 2017-128956
Apr. 11, 2018 (JP) .................................. 2018-076383

(51) Int. Cl.

| G06T 3/00 | (2006.01) |
|---|---|
| G06T 3/60 | (2006.01) |
| H04N 5/232 | (2006.01) |
| G06T 3/40 | (2006.01) |
| G06T 7/70 | (2017.01) |
| G06T 5/00 | (2006.01) |
| G06K 9/00 | (2006.01) |
| G06K 9/32 | (2006.01) |

(52) U.S. Cl.
CPC .......... G06T 3/0062 (2013.01); G06T 3/4038 (2013.01); G06T 3/60 (2013.01); G06T 5/006 (2013.01); G06T 7/70 (2017.01); H04N 5/23238 (2013.01); G06K 9/00228 (2013.01); G06K 9/00362 (2013.01); G06K 9/3233 (2013.01); G06T 2207/10024 (2013.01); G06T 2207/20021 (2013.01); G06T 2207/20101 (2013.01); G06T 2207/20104 (2013.01)

(58) Field of Classification Search
CPC ....... G06T 3/0062; G06T 3/4038; G06T 3/60; G06T 7/70; H04N 5/23238; G06K 9/00228; G06K 9/3233; G06K 9/00362
See application file for complete search history.

(56) References Cited

U.S. PATENT DOCUMENTS

2017/0236323 A1* 8/2017 Lim ........................ G06T 15/04
345/419

FOREIGN PATENT DOCUMENTS

JP 2001-298652 A 10/2001

* cited by examiner

*Primary Examiner* — Nam D Pham
(74) *Attorney, Agent, or Firm* — Canon U.S.A., Inc. IP Division

(57) ABSTRACT

An image processing apparatus includes an acquisition unit, a determination unit, and a conversion unit. The acquisition unit is configured to acquire at least one or more pieces of input image data used to represent an image. The determination unit is configured to determine a region of interest in the input image data. The conversion unit is configured to convert, based on the region of interest, the input image data into output image data representing at least a part of the image in equidistant cylindrical projection.

20 Claims, 15 Drawing Sheets

IMAGE PROCESSING APPARATUS AND IMAGE PROCESSING METHOD TO REPRESENT PART OF SPHERICAL IMAGE IN PLANAR IMAGE USING EQUIDISTANT CYLINDRICAL PROJECTION

BACKGROUND OF THE INVENTION

Field of the Invention

Aspects of the embodiments generally relate to an image processing technique for retaining planar image data representing a spherical image.

Description of the Related Art

There is a known technology of displaying an image to a viewer wearing, for example, a head-mounted display in conformity with the movement of a line of sight of the viewer. The technology displays a partial image in conformity with the direction of a line of sight of the viewer from among an omnidirectional image representing all of the images with a 360-degree field of view around a given position, so that the viewer can experience a sense of realism such as feeling as if the viewer is there. The omnidirectional image represents all of the images in all directions and, therefore, has a huge amount of data. Therefore, in recent years, methods of appropriately storing an omnidirectional image have been studied. A method discussed in Japanese Patent Application Laid-Open No. 2001-298652 divides an omnidirectional image into a plurality of segment images, projects upper and lower polar portions, such as the sky and the ground, which are low in variance, onto a planar circle and expresses the upper and lower polar portions in polar coordinates, and performs interpolation on portions other than the polar portions into a rectangle and applies compression processing that is based on an orthogonal coordinate system to the rectangle. With this, the method compresses an omnidirectional image in an efficient manner.

However, in the method discussed in Japanese Patent Application Laid-Open No. 2001-298652, since an omnidirectional image is expressed in different coordinate systems depending on regions thereof, to generate a displayed image from the omnidirectional image, processing operations differing according to the regions would be required.

SUMMARY OF THE INVENTION

Aspects of the embodiments are generally directed to appropriately converting an omnidirectional image into a planar image without dividing the omnidirectional image into regions and performing processing operations differing according to the regions.

According to an aspect of the embodiments, an image processing apparatus includes an acquisition unit, a determination unit, and a conversion unit. The acquisition unit is configured to acquire at least one or more pieces of input image data used to represent an image. The determination unit is configured to determine a region of interest in the input image data. The conversion unit is configured to convert, based on the region of interest, the input image data into output image data representing at least a part of the image in equidistant cylindrical projection.

Further features of the disclosure will become apparent from the following description of exemplary embodiments with reference to the attached drawings.

DESCRIPTION OF THE EMBODIMENTS

Figure 1:
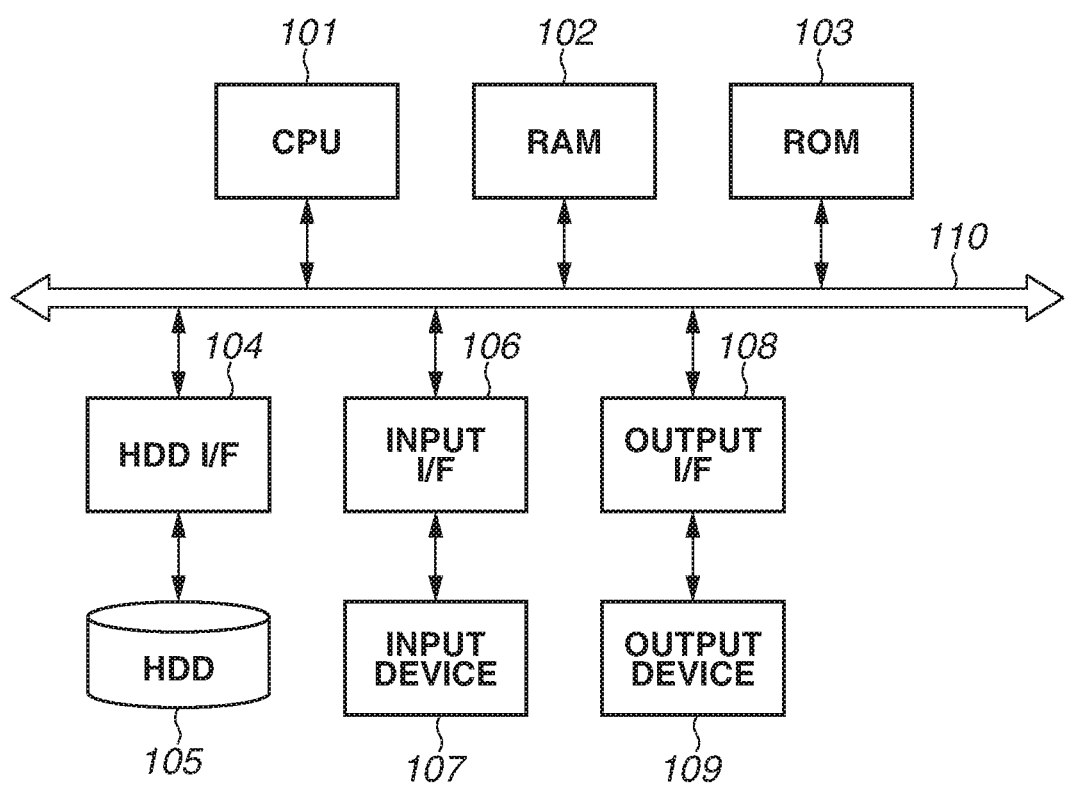
FIG. 1 is a block diagram illustrating a configuration of an image processing apparatus according to a first exemplary embodiment.

Various exemplary embodiments, features, and aspects of the disclosure will be described in detail below with reference to the drawings. Moreover, the following exemplary embodiments do not necessarily limit the disclosure, and not all of the combinations of features described in the exemplary embodiments are essential for solutions in the present disclosure. Furthermore, the same configurations are assigned the respective same reference characters for purposes of illustration.

The description of a first exemplary embodiment is directed to a method of determining a region of interest intended to be stored at high resolution in an omnidirectional image, changing axes of the omnidirectional image in such a manner that the region of interest is equivalent to a position close to a pole, and then converting the omnidirectional image into a planar image in equidistant cylindrical projection. Furthermore, the omnidirectional image, which is a spherical image and is also called, for example, a 360-degree image or an all-sky image, refers to an image representing a scene in all directions from a given position. Moreover, an image processing apparatus according to the present exemplary embodiment stores an omnidirectional image which is used for a head-mounted display (HMD) worn on the head of the viewer to allow the viewer to view an image. In the HMD, a partial image in a line-of-sight direction in an omnidirectional image appropriately stored according to the present exemplary embodiment is displayed on a display in conformity with the line of sight of the viewer wearing the HMD. An image to be displayed on the HMD is assumed to be generated by the HMD or an image processing apparatus which performs image outputting to the HMD. The image to be displayed on the HMD is an omnidirectional image which the image processing apparatus according to the present exemplary embodiment stores or an image obtained after various image processing operations are performed on a part of the omnidirectional image.

A hardware configuration of the image processing apparatus according to the present exemplary embodiment is described with reference to FIG. 1. The image processing apparatus according to the present exemplary embodiment is, for example, a personal computer which reads image data and performs various image processing operations thereon. A central processing unit (CPU) 101 executes a program stored in a read-only memory (ROM) 103 or a hard disk drive (HDD) 105 while using a random access memory (RAM) 102 as a work memory and thus controls various constituent components described below via a system bus 110. With this, various processing operations are performed. An HDD interface (I/F) 104 is provided for connection to a secondary storage device, such as the HDD 105 or an optical disk drive. For example, the HDD I/F 104 is an interface such as Serial ATA (SATA). The CPU 101 is able to perform data reading from the HDD 105 and data writing to the HDD 105 via the HDD I/F 104. Moreover, the CPU 101 is able to load data stored in the HDD 105 onto the RAM 102 and is similarly able to store data loaded on the RAM 102 in the HDD 105. The data loaded on the RAM 102 may include: (1) instructions that constitute a program to be executed by the CPU 101, (2) data (e.g., temporary values, intermediate results, constants, parameters, pre-defined values) used by the program, or any other data (e.g., acquired values) needed for the processing. Then, the CPU 101 is able to execute the program to perform operations described in the following. An input interface (I/F) 106 may include a parallel or a serial bus interface, such as universal serial bus (USB) or IEEE 1394, provided for connection to an input device 107, such as a keyboard, a mouse, a digital camera, or a scanner. The CPU 101 is able to read data from the input device 107 via the input I/F 106. An output interface (I/F) 108 is provided for connection to an output device 109, such as a display, of the image processing apparatus. The output I/F 108 is a video output interface, such as Digital Visual Interface (DVI) or High-Definition Multimedia Interface (HDMI). The CPU 101 is able to send data or command to the output device 109 via the output I/F 108 to cause the output device 109 to perform displaying. As mentioned above, in the present exemplary embodiment, an HMD is assumed to be used as the output device 109.

Figure 2:
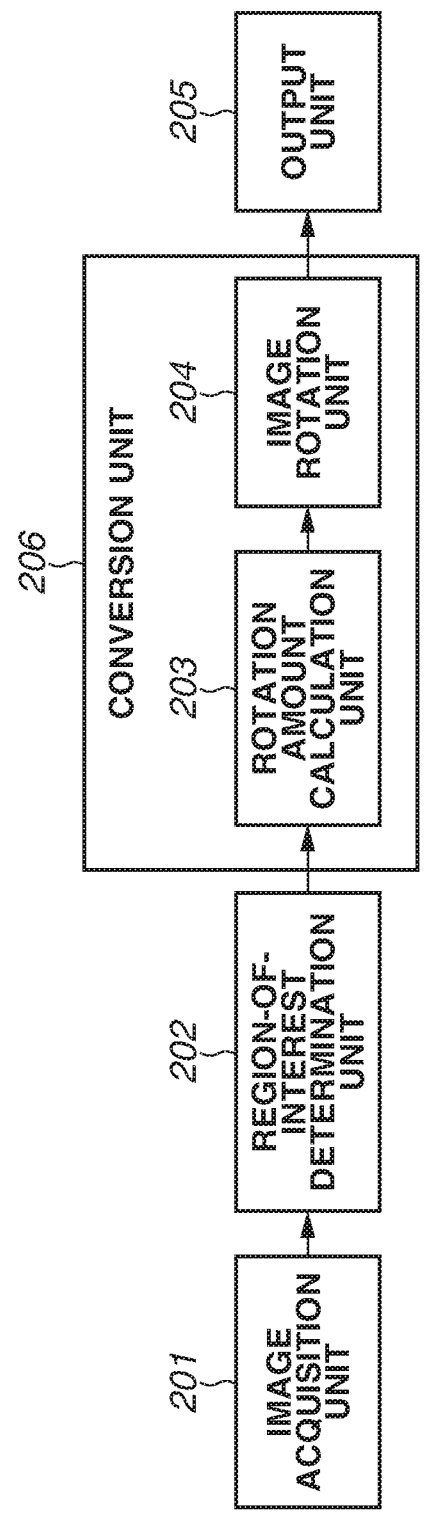
FIG. 2 is a block diagram illustrating a detailed logical configuration of the image processing apparatus according to the first exemplary embodiment.

FIG. 2 is a block diagram illustrating a logical configuration of the image processing apparatus according to the present exemplary embodiment. The CPU 101 functions as each functional block illustrated in FIG. 2 by reading out a program stored in the ROM 103, instructions or program downloaded in the RAM 102, or the HDD 105 and executing the program while using the RAM 102 as a work area. The CPU 101 executes the program or instructions to perform the operations described in one or more functional blocks in FIG. 2. Furthermore, the CPU 101 does not necessarily need to function as all of the functional blocks illustrated in FIG. 2, a dedicated processing circuit corresponding to each functional block can be provided.

Figure 5:
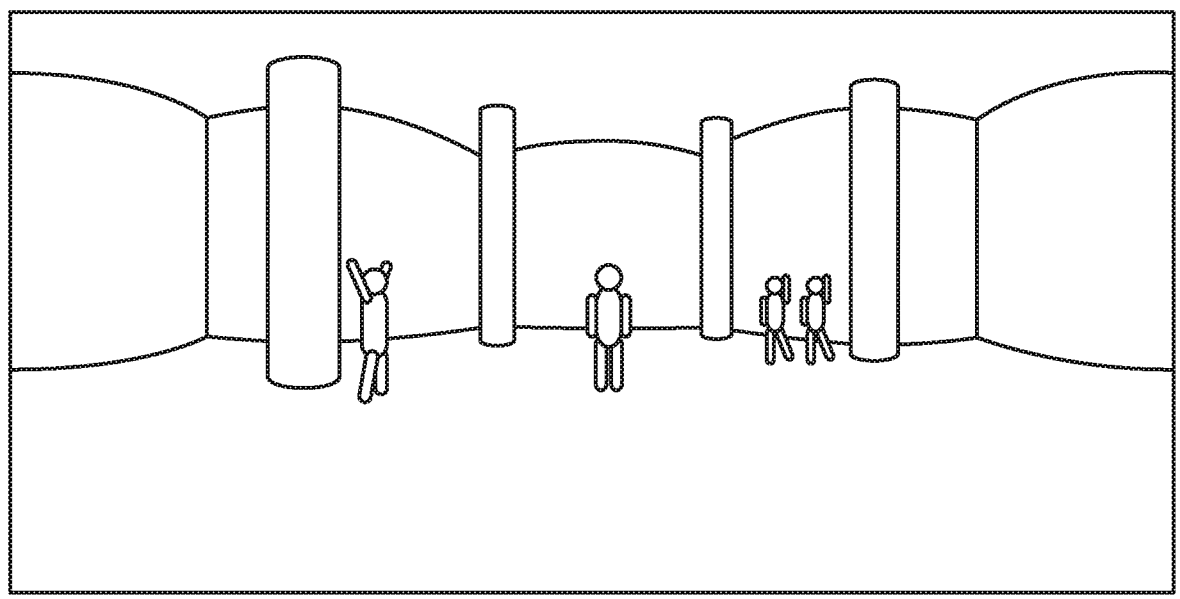
FIG. 5 is a diagram illustrating an example of an omnidirectional image in equidistant cylindrical projection.
Figure 6:
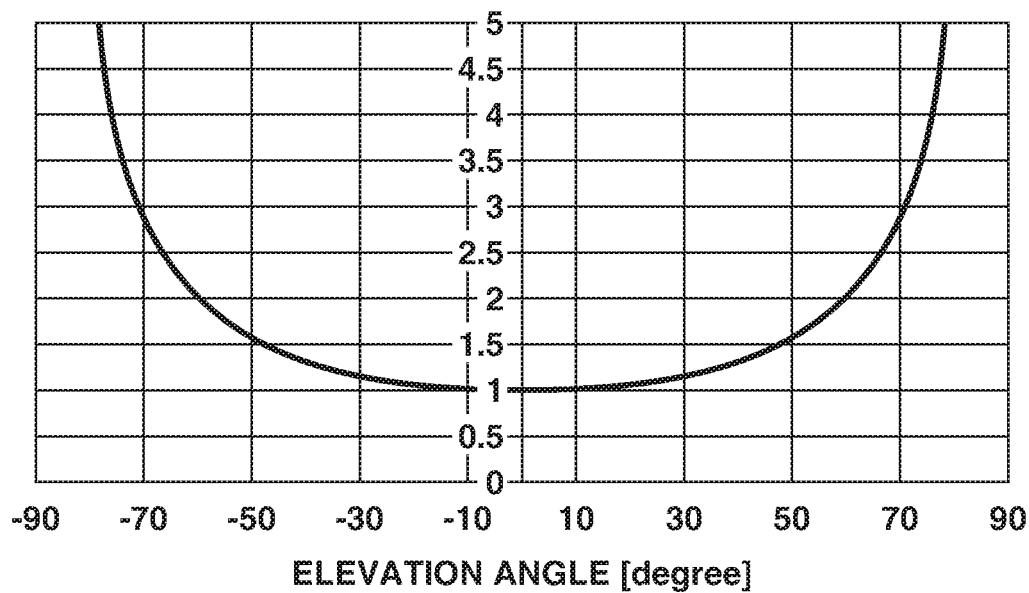
FIG. 6 is a graph illustrating a change of resolutions relative to elevation angles in equidistant cylindrical projection.

An image acquisition unit 201 acquires input image data representing an omnidirectional image. The input image data may include objects in a scene such as people, animals, man-made objects, etc. The acquisition may be carried out using an image sensor or a camera having a visual field that covers approximately (e.g., within 5%) the entire sphere. The input image data representing an omnidirectional image refers to image data in which colors of incident light rays in all directions at a given spot are stored. The input image data to be acquired here is image data projected onto a plane in equidistant cylindrical projection. FIG. 5 illustrates an omnidirectional image expressed in equidistant cylindrical projection. The equidistant cylindrical projection is known as one of map projections and is a diagram method of performing projection onto a plane by allocating the longitude and latitude of the earth to vertical and horizontal positions of a plane, respectively. The equidistant cylindrical projection may be used as a method of storing image data of an omnidirectional image. In equidistant cylindrical projection, the horizontal axis of image data is set as an azimuth angle $\theta$. The range of the azimuth angle $\theta$ is $[-\pi\ \pi]$. Moreover, the vertical axis of image data is set as an elevation angle $\varphi$, and the range of the elevation angle $\varphi$ is $[-\pi/2\ \pi/2]$. Image data is configured with pixels in which color information at respective positions discretized with respect to the azimuth angle $\theta$ and the elevation angle $\varphi$ is stored as pixel values. In image data, the width thereof is assumed to be w pixels and the height thereof is assumed to be h pixels. FIG. 6 illustrates a graph indicating a change of resolution relative to a change of the elevation angle $\varphi$ in equidistant cylindrical projection. The resolution represents the angle of a light ray incident on one pixel of the omnidirectional image. The graph illustrated in FIG. 6 indicates the ratio of the resolution at each elevation angle to the resolution of an image at an elevation angle of 0 degrees. According to the graph illustrated in FIG. 6, in regions in which the absolute value of the elevation angle exceeds 70 degrees, the resolution becomes three times or more as compared with the region in which the elevation angle is 0 degrees. In this way, it can be seen that the resolution becomes higher in regions in which the absolute value of the elevation angle is larger.

Positions equivalent to the North Pole (zenith) and the South Pole (nadir) when an omnidirectional image projected onto a plane in equidistant cylindrical projection is mapped onto a spherical surface are referred to as "poles". In an image expressed in equidistant cylindrical projection, each pole is not a point but has a breadth, and the uppermost row and lowermost row of the image are equivalent to the positions of poles. On the other hand, the position of the equator in the spherical surface is equivalent to a center horizontal line in the omnidirectional image. As illustrated in FIG. 6, in an omnidirectional image projected onto a plane in equidistant cylindrical projection, the position of each pole has the highest resolution, and the resolution becomes higher in regions closer to each pole than regions equivalent to the equator. Accordingly, a subject in which color information is stored at a pole region is able to be stored at higher resolution with use of a larger number of pixels than a subject in which color information is stored at other regions.

When a partial region of the omnidirectional image (hereinafter referred to as a "partial image") is displayed on the display of an HMD in conformity with the line-of-sight direction of a viewer wearing the HMD, it is supposed that various image processing operations are performed on the partial image. As a result of image processing such as reduction being performed on an omnidirectional image or a partial image, the image quality of the partial image may sometimes decrease. Therefore, in the present exemplary embodiment, the fact that, in the image of a plane obtained by projection in equidistant cylindrical projection, a region closer to a pole has higher resolution is used. A region to be stored at higher resolution in an omnidirectional image is specified as a region of interest, and the omnidirectional image is converted in such a manner that the position of the region of interest is equivalent to the position of a pole region, and is then stored.

A region-of-interest determination unit 202 specifies a region to be stored at high resolution from among input image data. In the present exemplary embodiment, an omnidirectional image serving as a processing target is displayed on a display, which is the output device 109, via the output I/F 108, and the user is allowed to designate a subject to be stored at high resolution. Such a designation is made via the input device 107, such as a mouse or a touch panel. In the present exemplary embodiment, the user is assumed to click, with a mouse, a subject to be set as a region of interest.

A conversion unit 206 converts input image data according to positions of the region of interest. The conversion unit 206 includes a rotation amount calculation unit 203 and an image rotation unit 204. The rotation amount calculation unit 203 calculates a rotation amount required to associate, or to connect, link, or relate the position of the designated point of interest with a pole region of the omnidirectional image. Furthermore, the omnidirectional image corresponds to a spherical image while being projected onto a planar image in equidistant cylindrical projection. Here, the rotation amount means the angle of rotation required to rotate the coordinate axes to change the position of a pole when the omnidirectional image is mapped onto a spherical surface. The image rotation unit 204 substantially rotates an omnidirectional image acquired by the image acquisition unit 201 according to the rotation amount calculated by the rotation amount calculation unit 203.

An output unit 205 outputs output image data obtained by converting the input image data in such a way as to associate the position of the point of interest designated by the image rotation unit 204 with a pole region of the omnidirectional image.

Figure 7:
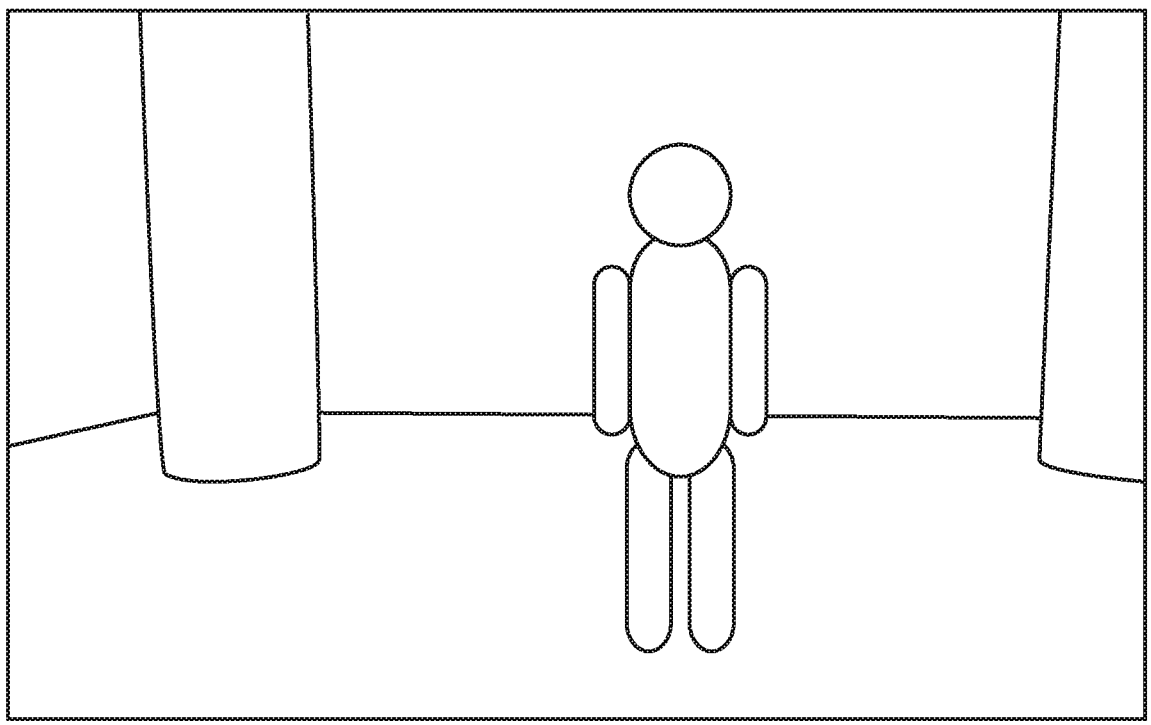
FIG. 7 is a diagram illustrating an example of a displayed image.

FIG. 7 illustrates an example of a displayed image generated from the omnidirectional image. As mentioned above, another image processing apparatus or HMD reads out an omnidirectional image stored in the image processing apparatus according to the present exemplary embodiment, and generates such a displayed image as illustrated in FIG. 7. The displayed image is able to be generated by capturing the image of a sphere having an omnidirectional image pasted to the inner side thereof. As shown in FIG. 7, the displayed image is generated by referring to a partial region of the omnidirectional image. Accordingly, while, in the present exemplary embodiment, a spherical omnidirectional image is employed as an input, a configuration in which only a part of the omnidirectional image, such as a hemispherical image, required for a displayed image includes pixel data and the remaining part thereof does not include pixel data can be employed.

Figure 3:
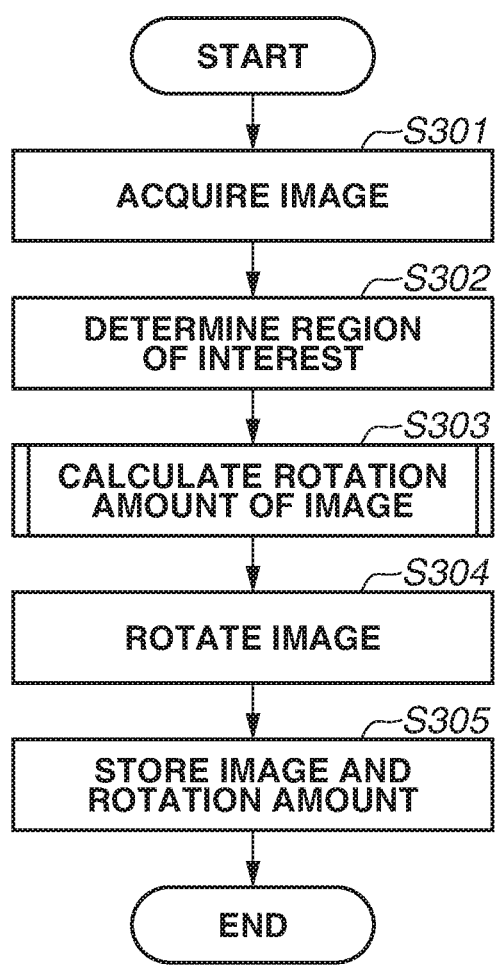
FIG. 3 is a flowchart illustrating a flow of processing in the image processing apparatus according to the first exemplary embodiment.

FIG. 3 is a flowchart illustrating the flow of image processing in the first exemplary embodiment. The image processing is implemented by the CPU 101 reading out and executing a program for performing the flowchart illustrated in FIG. 3. First, in step S301, the image acquisition unit 201 acquires input image data obtained by projecting an omnidirectional image onto a planar image.

In step S302, the region-of-interest determination unit 202 determines a point of interest, which is usable to define a region as a region of interest, according to an input from the user. The point of interest is a point which is representative of a region of interest. As mentioned above, the user clicks the position of a subject of interest in an omnidirectional image displayed on the display. The region-of-interest determination unit 202 sets the clicked position as a point of interest $(x_i, y_i)$. Here, x and y denote the coordinates in an image, and i denotes an index of the determined point of interest. Furthermore, in a case where, instead of clicking, a region containing a subject is designated as a region of interest, the barycentric position of the region is set as a point of interest $(x_i, y_i)$.

In step S303, the rotation amount calculation unit 203 calculates a rotation amount of the input image data based on the position of the point of interest. In the present exemplary embodiment, the rotation of an image is expressed by a rotation matrix R. The rotation can be expressed by another expression form, such as Euler angle or quaternion. Details of the rotation amount calculation processing are described below.

In step S304, the image rotation unit 204 performs rotation processing on input image data I, which is an omnidirectional image, and outputs output image data I', which is an omnidirectional image obtained by performing conversion in such a manner that the subject of interest is equivalent to a pole region in the image. Here, rotation processing of an omnidirectional image is performed not by rotation in an image coordinate system but by rotation in a spherical coordinate system. In other words, the omnidirectional image is not rotated on a two-dimensional plane, but the omnidirectional image is mapped onto a spherical surface, the sphere subjected to mapping is rotated, and, after rotation, the omnidirectional image is re-converted into a planar image obtained by projection in equidistant cylindrical projection. Each pixel in the output image data I' obtained after rotation is calculated by sampling pixel values from the input image data I in view of rotation. For this purpose, first, with respect to each pixel (x', y') in the output image data I' obtained after rotation, the image rotation unit 204 calculates coordinates (x, y) in the acquired input image data I corresponding to the pixel. Next, the image rotation unit 204 performs sampling on a pixel value of the coordinates (x, y) to obtain a pixel value of the pixel (x', y') in the output image data I'. The method of obtaining the coordinates (x, y) in the input image data I corresponding to the coordinates (x', y') in the output image data I' obtained after rotation processing is described as follows. First, the image rotation unit 204 converts coordinates (x', y') in an image coordinate system into an azimuth angle and an elevation angle. When the width of the input image data I is denoted by w and the height thereof is denoted by h, the image rotation unit 204 calculates an azimuth angle θ' and an elevation angle φ' corresponding to the coordinates (x', y') using the following formulae (1).

$$\theta' = \left(x' - \frac{w}{2}\right)\frac{2\pi}{w} \qquad (1)$$
$$\varphi' = \left(y' - \frac{h}{2}\right)\frac{\pi}{h}$$

Next, the image rotation unit 204 expresses the azimuth angle θ' and the elevation angle θ' with a rotation matrix, and converts a matrix M integrated with an inverse matrix $R^{-1}$ of the rotation matrix R of the omnidirectional image calculated in step S303 into expressions of an azimuth angle and an elevation angle, thus calculating an azimuth angle θ and an elevation angle φ in the acquired omnidirectional image. The azimuth angle θ and the elevation angle φ are calculated with use of the following formulae (2).

$$M = \begin{bmatrix} m_{11} & m_{12} & m_{13} \\ m_{21} & m_{22} & m_{23} \\ m_{31} & m_{32} & m_{33} \end{bmatrix}$$

$$\theta = a\tan\left(\frac{m_{13}}{m_{33}}\right)$$

$$\varphi = a\sin(-m_{23})$$

(2)

Here, "a tan" denotes an arc tangent function, and "a sin" denotes an arc sine function.

Then, the image rotation unit 204 converts the azimuth angle θ and the elevation angle φ into the coordinates (x, y) in the acquired omnidirectional image. This conversion can be calculated with use of the following formulae (3).

$$x = \frac{w}{2\pi}\theta + \frac{w}{2}$$

$$y = \frac{h}{\pi}\varphi + \frac{h}{2}$$

(3)

Finally, the image rotation unit 204 calculates a pixel value of the coordinates (x, y) in the acquired input image data I and sets the calculated pixel value as a pixel value of the coordinates (x', y') in the output image data I' obtained after rotation. Here, the image rotation unit 204 calculates a pixel value by linear interpolation from four pixels near and around the coordinates (x, y) and sets the calculated pixel value as a pixel value of the coordinates (x', y') in the output image data I' obtained after rotation. However, the calculation method is not limited to linear interpolation, but can be another interpolation method such as a bicubic method.

In step S305, the output unit 205 outputs the output image data obtained after rotation processing and the rotation matrix R used for rotation processing to the HDD 105 or the RAM 102. Thus far is the flow of processing performed in the image processing apparatus according to the present exemplary embodiment.

Figure 4:
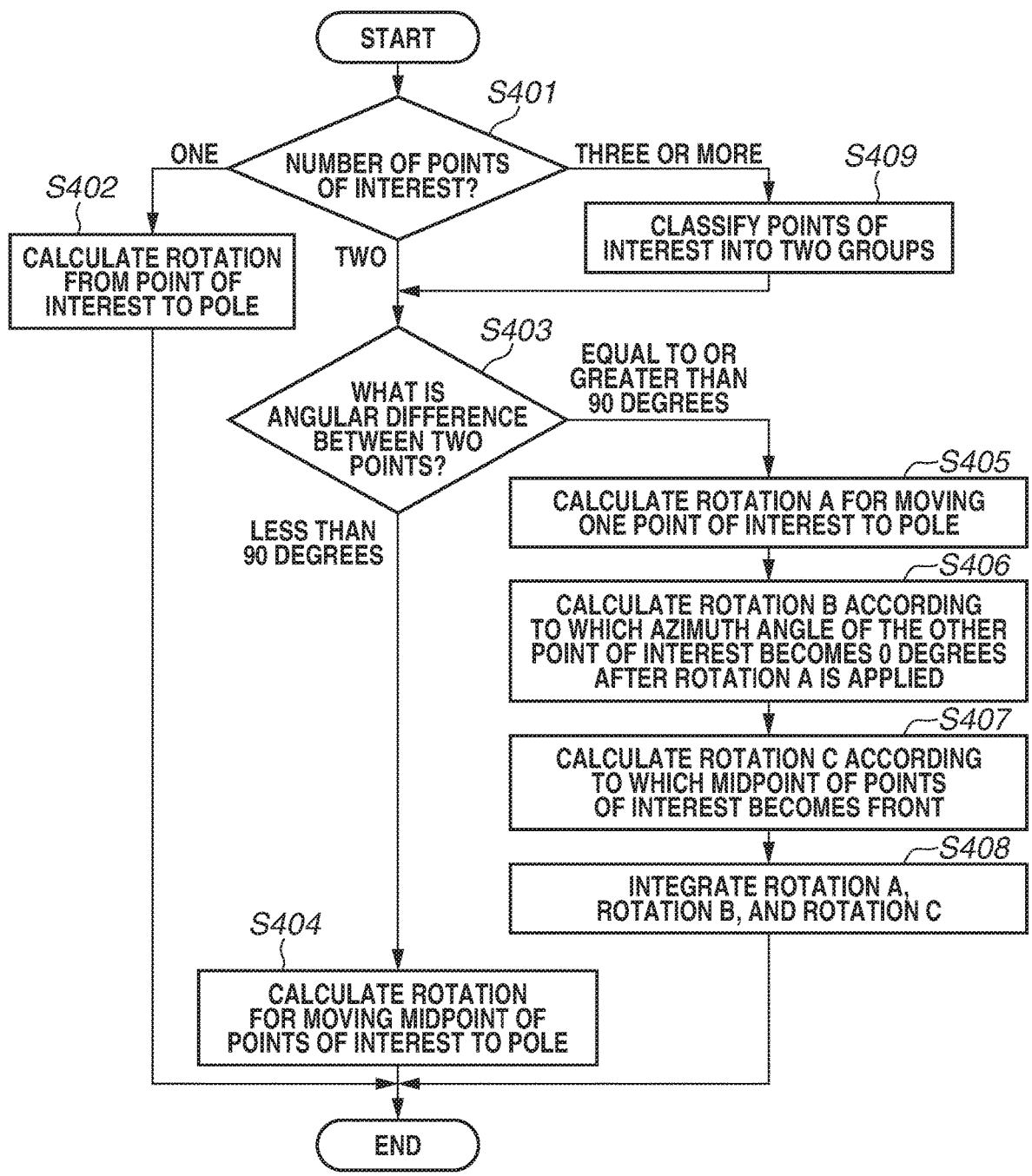
FIG. 4 is a flowchart illustrating a flow of rotation amount calculation processing.

Here, details of the rotation amount calculation processing which is performed by the rotation amount calculation unit 203 in step S303 are described. The rotation amount calculation processing is performed to calculate the rotation amount of input image data in such a manner that a subject of interest is equivalent to a region having a high resolution. In the case of an omnidirectional image in equidistant cylindrical projection, the resolution of regions closer to the uppermost and lowermost positions, which are poles of a sphere, is higher, and the resolution of the center height (a portion near the equator) of the omnidirectional image is low. Therefore, the rotation amount calculation unit 203 calculates a rotation amount required in such a manner that a subject of interest moves to the upper or lower region of the image, in other words, to the position in which the absolute value of the elevation angle is large. In a case where there is one subject of interest, the rotation amount calculation unit 203 calculates the rotation amount in such a manner that the subject of interest moves to one of the poles, and, in a case where there is a plurality of subjects of interest, the rotation amount calculation unit 203 calculates the rotation amount in such a manner that the plurality of subjects of interest is allocated to one or two poles. FIG. 4 is a flowchart of the rotation amount calculation processing.

In step S401, the rotation amount calculation unit 203 selects processing to be next performed according to the number of points of interest. If the number of points of interest output from the region-of-interest determination unit 202 is one (ONE in step S401), the rotation amount calculation unit 203 performs step S402, if it is two (TWO in step S401), the rotation amount calculation unit 203 performs step S403, and, if it is three or more (THREE OR MORE in step S401), the rotation amount calculation unit 203 performs step S409.

Figure 8:
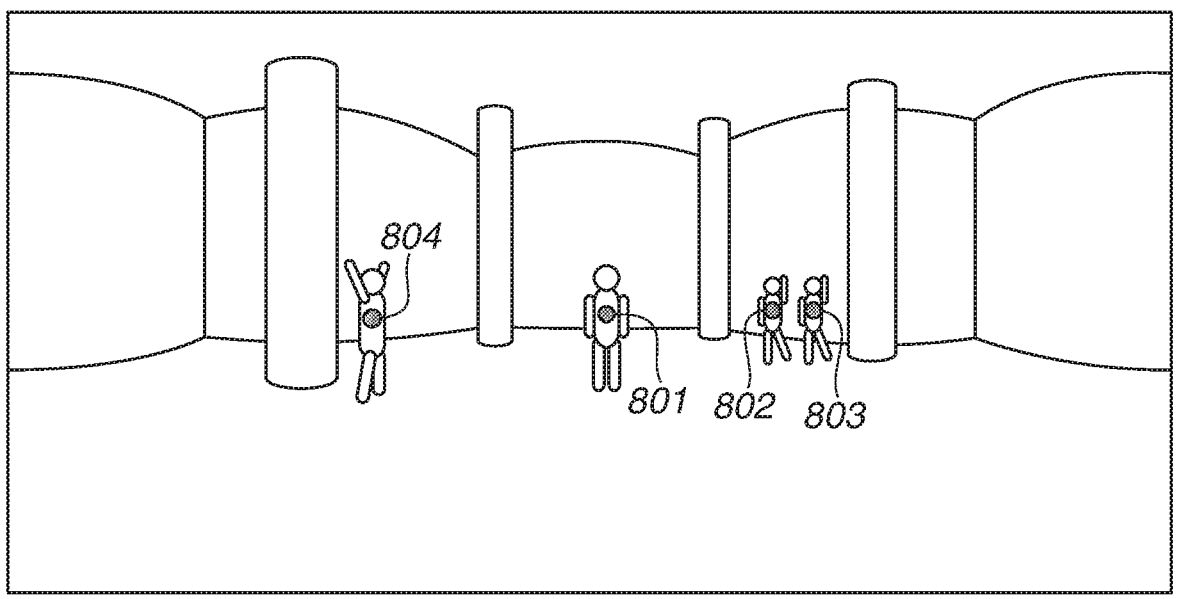
FIG. 8 is a diagram illustrating input image data.
Figure 9:
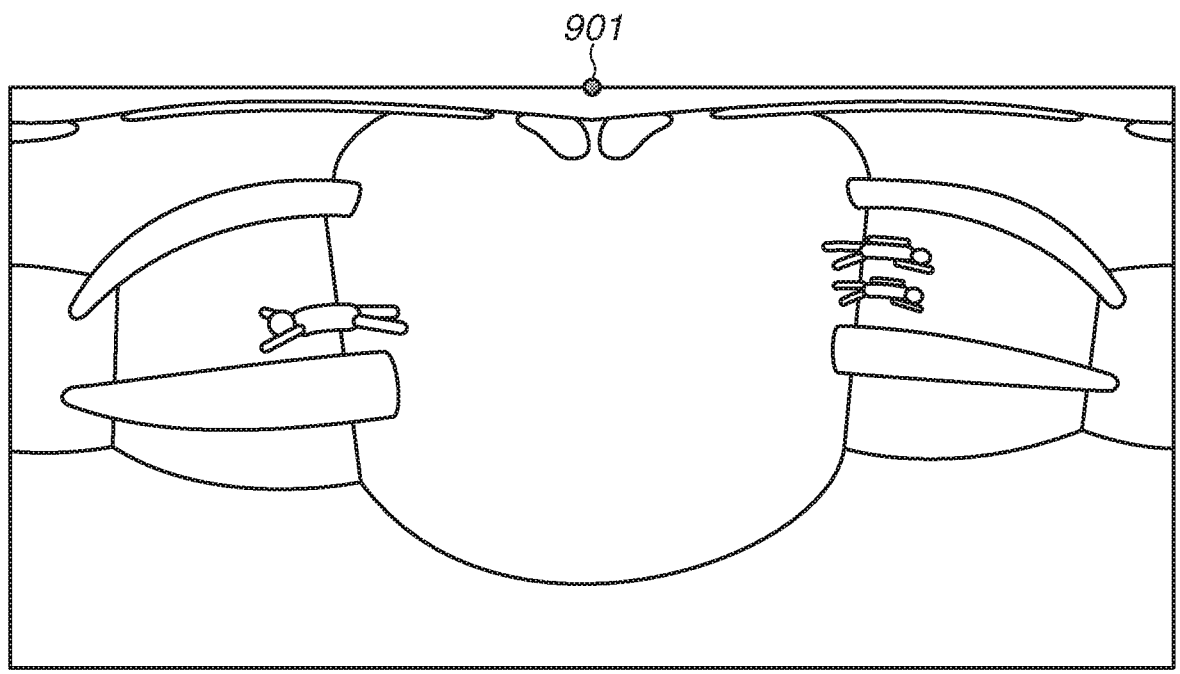
FIG. 9 is a diagram illustrating an image obtained after rotation processing is performed in a case where there is only one point of interest.

In step S402, the rotation amount calculation unit 203 calculates a rotation matrix required to move the point of interest to the position of a pole. While there are two poles, the uppermost one and the lowermost one, in an image expressed in equidistant cylindrical projection, the rotation amount calculation unit 203 can select either one. FIG. 8 illustrates an example of the acquired omnidirectional image. A point 801 is assumed to be one given point of interest. FIG. 9 illustrates an example of the case where the omnidirectional image projected in equidistant cylindrical projection has been rotated in such a way as to move the point 801 to a point 901 representing one point at the zenith of the two poles. In step S402, the rotation amount calculation unit 203 calculates a rotation amount according to which the point of interest 801 moves to the position of the point 901. Since, when the omnidirectional image is considered as a sphere, a pole is equivalent to the uppermost row of the omnidirectional image, such a rotation as to move a point at a given position to the pole can be expressed by a rotation only in the pitch direction. Since the rotation in this case is a rotation from an elevation angle $\varphi_a$ of the point of interest 801 to an elevation angle π/2 of the point 901, the rotation amount is "π/2−$\varphi_a$". In the above-described way, such a rotation amount to move one point of interest to a pole is calculated from the pitch direction "π/2−$\varphi_a$".

In step S403, the rotation amount calculation unit 203 further branches the processing according to the angular difference between the designated two points of interest. If the angular difference between two points is less than 90 degrees (LESS THAN 90 DEGREES in step S403), the rotation amount calculation unit 203 advances the processing to step S404, and, if the angular difference is equal to or greater than 90 degrees (EQUAL TO OR GREATER THAN 90 DEGREES in step S403), the rotation amount calculation unit 203 advances the processing to step S405. In step S404, the rotation amount calculation unit 203 calculates a rotation amount according to which two points of interest come close to the same pole. On the other hand, in the processing performed in step S405 to step S407, the rotation amount calculation unit 203 calculates rotation amounts according to which two points of interest come close to the respective different poles.

Figure 10:
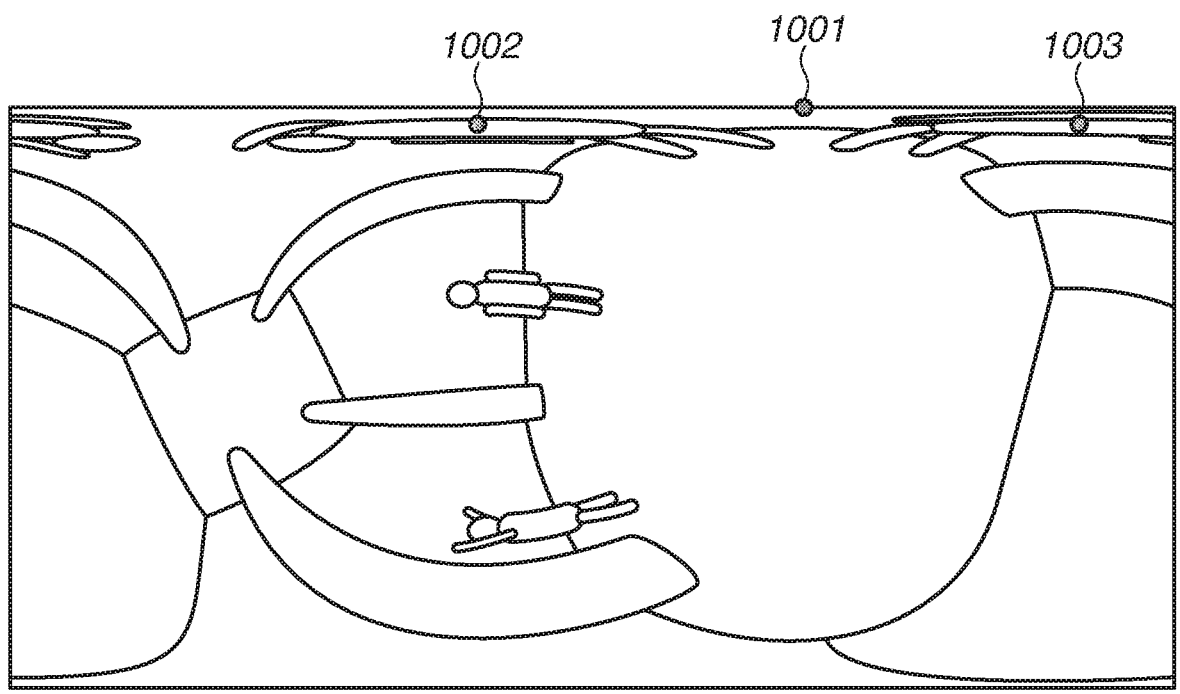
FIG. 10 is a diagram illustrating an image obtained after rotation processing is performed in a case where the angular difference between two points of interest is less than 90 degrees.

In step S404, the rotation amount calculation unit 203 calculates such a rotation amount as to move the midpoint between two points of interest ($\omega_a$, $\varphi_a$) and ($\theta_b$, $\varphi_b$) to one of the poles. The pole to be selected in this case can be either one of the two poles, the uppermost one and lowermost one. Since the rotation of a sphere is considered, the midpoint between two points of interest is required to be calculated not on image coordinates but on spherical coordinates. For example, spherical linear interpolation can be used to calculate the midpoint. The rotation amount required to move one midpoint ($\theta_c$, $\varphi_c$) to a pole is calculated as the rotation amount "π/2−φ$_a$" only in the pitch direction in such a manner that the elevation angle becomes π/2, as in step S402. FIG. 10 is a diagram illustrating a result of rotation in a case where two points of interest 802 and 803 are designated. The rotation amount calculation unit 203 calculates a rotation amount according to which the midpoint between two points of interest moves to a pole at the zenith, in other words, the uppermost row, such as a point 1001. The two points of interest 802 and 803 are thus moved to points 1002 and 1003, respectively, as illustrated in FIG. 10. On the other hand, in step S405, the rotation amount calculation unit 203 calculates a rotation amount required to move one point of interest of the two designated points of interest (θ$_a$, φ$_a$) and (θ$_b$, φ$_b$) to a pole. While the point of interest to be selected can be either one, here, the point of interest (θ$_a$, φ$_a$) designated for the first time is assumed to be selected. When the azimuth angle and elevation angle of the point of interest are denoted by θ$_a$ and φ$_a$, respectively, the rotation amount calculation unit 203 calculates a rotation matrix R$_A$ according to which rotation is performed in the pitch direction only by "π/2−φ$_a$" in such a manner that the elevation angle becomes π/2 while the azimuth angle remains θ$_a$, as expressed in the following formula (4).

$$R_A = \begin{bmatrix} 1 & 0 & 0 \\ 0 & \cos(\frac{\pi}{2}-\varphi_a) & \sin(\frac{\pi}{2}-\varphi_a) \\ 0 & -\sin(\frac{\pi}{2}-\varphi_a) & \cos(\frac{\pi}{2}-\varphi_a) \end{bmatrix} \quad (4)$$

In step S406, after applying the rotation matrix R$_A$ calculated in step S405 to the input image data, the rotation amount calculation unit 203 calculates a rotation amount in the yaw direction according to which the azimuth angle of the point of interest (θ$_b$, φ$_b$), which has not been selected in step S405 in the omnidirectional image, becomes 0 degrees. For this purpose, when the azimuth angle of the point of interest is denoted by θ$_b$, the rotation amount calculation unit 203 calculates a rotation matrix R$_B$ for rotation only by −θ$_b$, as expressed in the following equation (5).

$$R_B = \begin{bmatrix} \cos(-\theta_b) & 0 & -\sin(-\theta_b) \\ 0 & 1 & 0 \\ \sin(-\theta_b) & 0 & \cos(-\theta_b) \end{bmatrix} \quad (5)$$

In step S407, the rotation amount calculation unit 203 calculates a rotation matrix R$_C$ for performing rotation in the pitch direction according to which the midpoint (ω$_c$, φ$_c$) between two points of interest obtained after the rotation matrices R$_A$ and R$_B$ are applied to the input image data becomes the front. After the rotation matrices R$_A$ and R$_B$ are applied, one point of interest is moved to a pole and the other point of interest is moved to the position (0, φ$_{b2}$) in which the azimuth angle is 0. Therefore, the midpoint between two points of interest is expressed by the following formula (6).

$$(\theta,\varphi)=(0,(\pi/2-\varphi_{b2})\times\frac{1}{2}) \quad (6)$$

To obtain rotation for moving the midpoint to the front (θ, φ)=(0, 0), the rotation amount calculation unit 203 calculates the rotation matrix R$_C$ for rotation in the pitch direction by −(π/2−φ$_{b2}$)×½, as expressed in the following formula (7).

$$R_C = \begin{bmatrix} 1 & 0 & 0 \\ 0 & \cos(\frac{-1}{2}(\frac{\pi}{2}-\varphi_{b2})) & \sin(\frac{-1}{2}(\frac{\pi}{2}-\varphi_{b2})) \\ 0 & -\sin(\frac{-1}{2}(\frac{\pi}{2}-\varphi_{b2})) & \cos(\frac{-1}{2}(\frac{\pi}{2}-\varphi_{b2})) \end{bmatrix} \quad (7)$$

Figure 11:
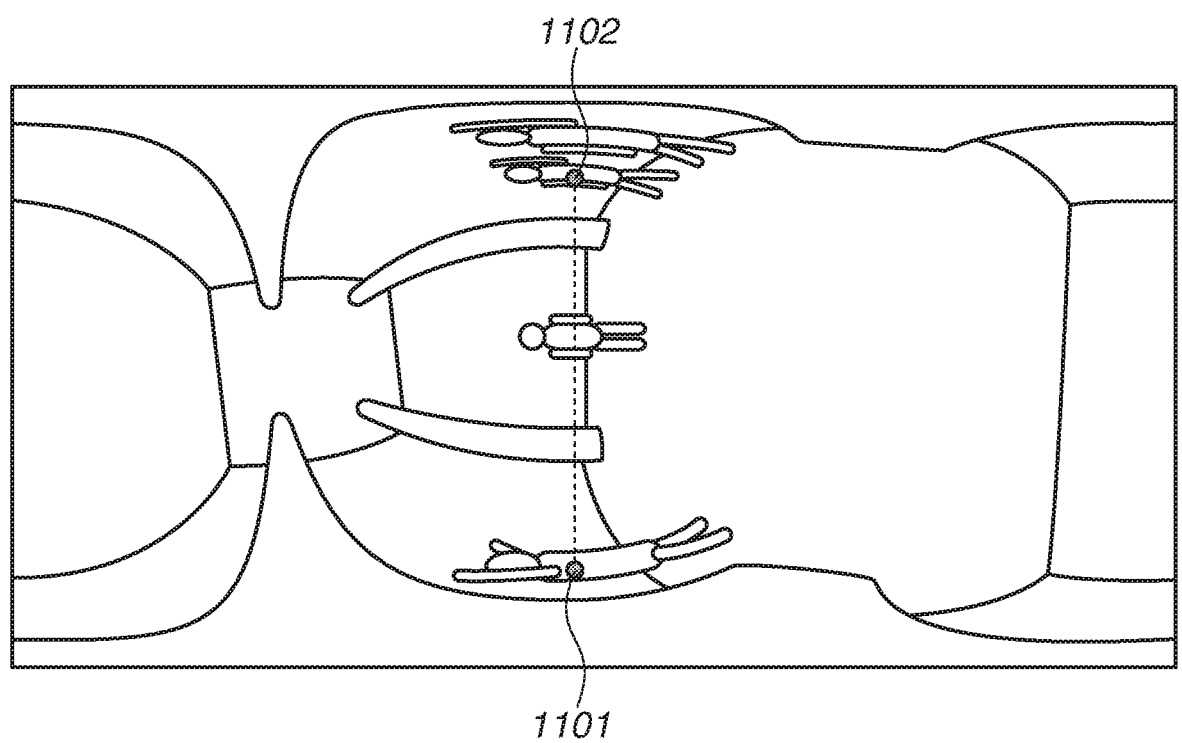
FIG. 11 is a diagram illustrating an image obtained after rotation processing is performed in a case where the angular difference between two points of interest is equal to or greater than 90 degrees.

In step S408, the rotation amount calculation unit 203 calculates such a rotation that two points of interest (θ$_a$, φ$_a$) and (θ$_b$, φ$_b$) come close to the respective different poles. This can be calculated by integrating the rotation matrices R$_A$, R$_B$, and R$_C$ calculated in steps S405 to S407. FIG. 11 is a diagram illustrating a result of rotation in a case where two points of interest 804 and 802 are designated. The two points of interest 804 and 802 are thus moved to points 1101 and 1102, respectively, as illustrated in FIG. 11.

In step S409, the rotation amount calculation unit 203 classifies three or more designated points of interest into two groups. Any suitable clustering method may be employed, such as k-means clustering, mean-shift clustering, agglomerative hierarchical clustering. In the present exemplary embodiment, k-means clustering is used for that classification. The distance between points of interest to be used in this case is a distance on spherical coordinates. In the processing performed in step S409 and subsequent steps, the rotation amount calculation unit 203 treats the respective centers of gravity of two groups obtained by classification as two points of interest. This enables performing processing similar to the case where there are two points of interest. For example, in a case where points 802, 803, and 804 illustrated in FIG. 8 are input as points of interest, the first group includes the point 804 and the second group includes the point 802 and the point 803. In the first group, the point 804 serves as a point of interest, and, in the second group, the barycentric position of the point 802 and the point 803 serves as a point of interest. In the above-described way, the rotation amount calculation processing performed by the rotation amount calculation unit 203 in the present exemplary embodiment is completed.

As described above, according to the first exemplary embodiment, a subject (region) to be stored in a region having a high resolution in a spherical image such as an omnidirectional image is specified, the omnidirectional image is converted into an image obtained by rotation in such a manner that the specified subject is equivalent to a pole region in the omnidirectional image, and the converted omnidirectional image is stored. With this, when image processing such as reduction is performed on an omnidirectional image or a partial image of the omnidirectional image, a subject of interest can be kept at high resolution.

In the first exemplary embodiment, the method of using one omnidirectional image as input image data and storing the omnidirectional image subjected to intended rotation processing has been described. In a second exemplary embodiment, a method of storing a subject of interest at high resolution when storing an omnidirectional image by combining a plurality of captured images which are not omnidirectional images is described. In this exemplary embodiment, before an omnidirectional image is generated, not an image obtained by synthesis but a coordinate system is rotated prior to synthesis. Furthermore, constituent components and processing operations similar to those in the first exemplary embodiment are assigned the respective same reference characters, and the detailed description thereof are omitted.

Figure 12:
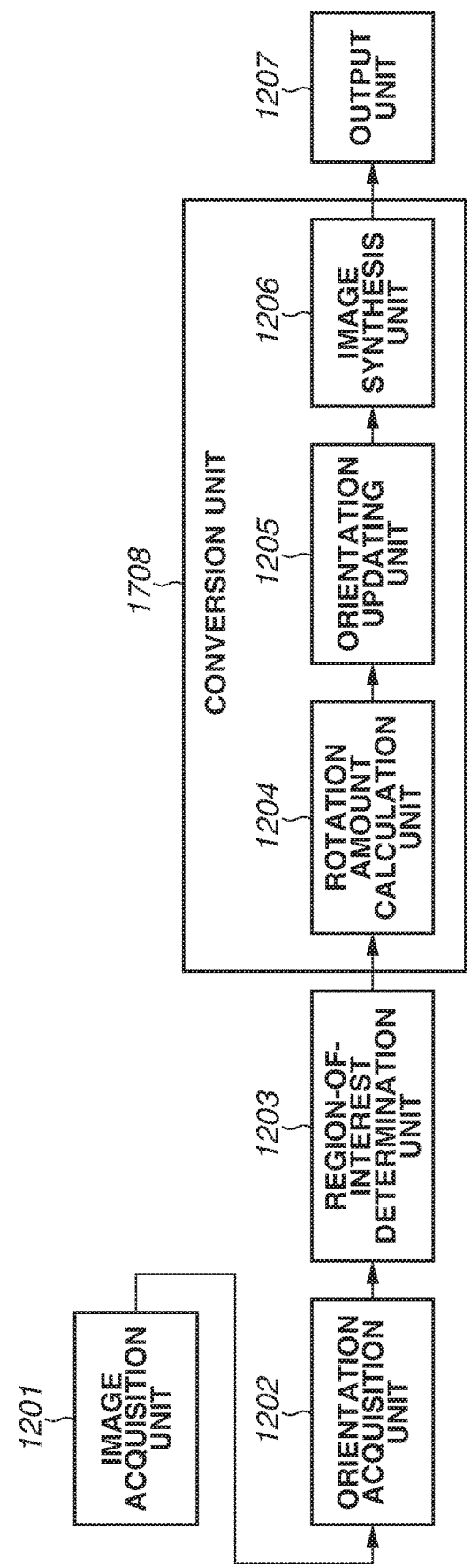
FIG. 12 is a block diagram illustrating a logical configuration of an image processing apparatus according to a second exemplary embodiment.
Figure 13:
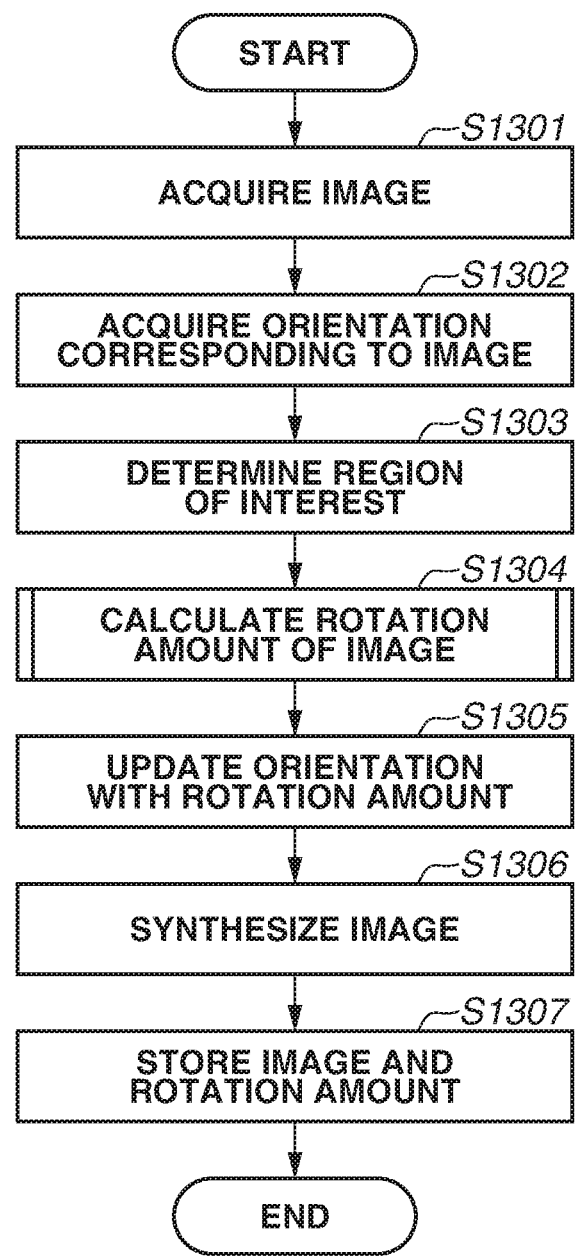
FIG. 13 is a flowchart illustrating a flow of processing in the image processing apparatus according to the second exemplary embodiment.

FIG. 12 is a block diagram illustrating a logical configuration of an image processing apparatus according to the second exemplary embodiment. Moreover, FIG. 13 is a flowchart illustrating processing which is performed by constituent elements illustrated in FIG. 12. The CPU 101 functions as constituent elements illustrated in FIG. 12 by reading out a program stored in the ROM 103, the RAM 102, or the HDD 105 to implement the flowchart of FIG. 13 and executing the program while using the RAM 102 as a work area.

In step S1301, an image acquisition unit 1201 outputs a plurality of pieces of image data acquired from the HDD 105 or the RAM 102 to an orientation acquisition unit 1202. Furthermore, the plurality of pieces of image data is assumed to be image data representing images captured from the same point of view. In the present exemplary embodiment, as in the first exemplary embodiment, it is assumed that an omnidirectional image is a planar image obtained by projection in equidistant cylindrical projection. Moreover, while, for ease of description, image data in which an intersection point between the optical axis of a lens and an image plane corresponds to the center of an image, which has no distortion, and which represents images captured from the same point of view is considered, in the following steps, processing with these taken into consideration can be performed.

In step S1302, the orientation acquisition unit 1202 acquires, from the HDD 105 or the RAM 102, orientation information indicating the orientation of a camera or an image sensor used to capture images represented by image data acquired from the image acquisition unit 1201. The orientation of a camera is information indicating in which direction the camera is facing, and is expressed by a rotation matrix. While, here, it is assumed that the orientation of a camera is previously calculated, the orientation of a camera can be calculated from an image.

In step S1303, a region-of-interest determination unit 1203 determines one or more regions of interest as points of interest. The region-of-interest determination unit 1203 converts a point of interest $(x_i, y_i)$ into a polar coordinate system to calculate an azimuth angle $\theta_i$ and an elevation angle $\varphi_i$. These are acquired by calculating, based on a rotation matrix $R_j$ indicating the orientation of a camera used to capture an image including the point of interest $(x_i, y_i)$, angles $\theta_i$ and $\varphi_i$ of a light ray passing through the point of interest $(x_i, y_i)$ in the image from the point of view of the camera. Here, j denotes an index of the image. When the focal length of the camera is denoted by f, coordinates X of the intersection point between the light ray and the image plane can be calculated by the following formula (8).

$$X = R_j \begin{bmatrix} x_i \\ y_i \\ f \end{bmatrix} \quad (8)$$

When the azimuth angle and elevation angle of the three-dimensional point X as viewed from the origin are denoted by $\theta_i$ and $\varphi_i$, the region-of-interest determination unit 1203 outputs a point of interest $(\theta_i, \varphi_i)$ to a rotation amount calculation unit 1204.

In step S1304, the rotation amount calculation unit 1204 calculates a rotation amount of the image based on the position of the point of interest $(\theta_i, \varphi_i)$, and outputs the rotation amount to an orientation updating unit 1205. In the present exemplary embodiment, the rotation amount calculation unit 1204 calculates the rotation amount of an omnidirectional image in a manner similar to that in the first exemplary embodiment.

In step S1305, the orientation updating unit 1205 updates orientation information about the camera based on a rotation matrix R indicating the rotation amount of the omnidirectional image and the orientation $R_j$ of the camera used to capture each image. The orientation updating unit 1205 uses an orientation $R_j'$, which is obtained by integrating the rotation matrix R indicating the rotation amount of the image with the orientation $R_j$ of the camera, as the orientation of the camera in the next processing. This updating enables performing synthesis with a coordinate system obtained by rotating the coordinate system of the input image, and, therefore, enables rotating an omnidirectional image obtained by synthesis.

In step S1306, an image synthesis unit 1206 synthesizes an image by using a plurality of pieces of image data $I_j$ and the updated orientation $R_j'$ as inputs. The image synthesis unit 1206 projects images captured by the camera onto an omnidirectional image in the spherical coordinate system based on input orientations of the camera. Then, the image synthesis unit 1206 blends pixel values of overlapping images in an overlapping region obtained by projecting images. The image synthesis unit 1206 outputs the synthesized omnidirectional image data to an output unit 1207.

In step S1307, the output unit 1207 outputs the omnidirectional image obtained after rotation and the rotation matrix R thereof to the HDD 105 or the RAM 102. In the above-described way, the image processing in the second exemplary embodiment is completed. According to the present exemplary embodiment, even when an omnidirectional image is synthesized from a plurality of input images, synthesis is performed in such a coordinate system that a region of interest is stored at a position available for high-resolution storage, so that a subject of interest can be stored at high resolution.

In the above-described exemplary embodiments, the method of performing rotation processing to form one omnidirectional image based on a manually-set region of interest and then storing the omnidirectional image has been described. In a third exemplary embodiment, a method of automatically detecting and storing a subject of interest is described. In the present exemplary embodiment, a subject of interest is detected based on a detection mode which is set. Furthermore, constituent components and processing operations similar to those in the first exemplary embodiment are assigned the respective same reference characters, and the detailed description thereof are omitted.

Figure 14:
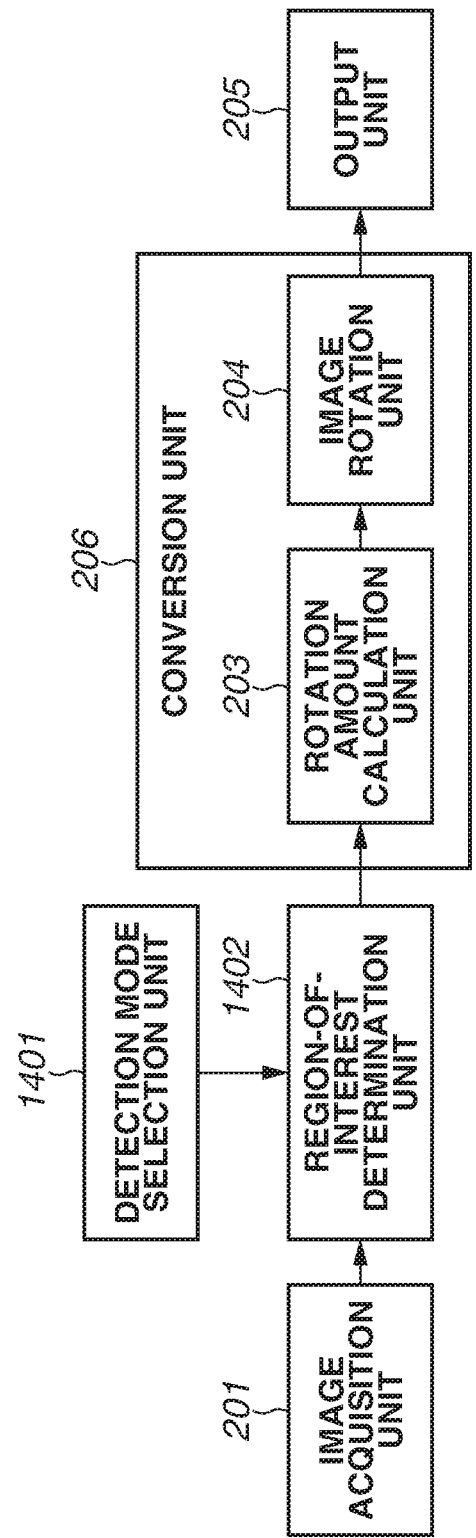
FIG. 14 is a block diagram illustrating a detailed logical configuration of an image processing apparatus according to a third exemplary embodiment.
Figure 15:
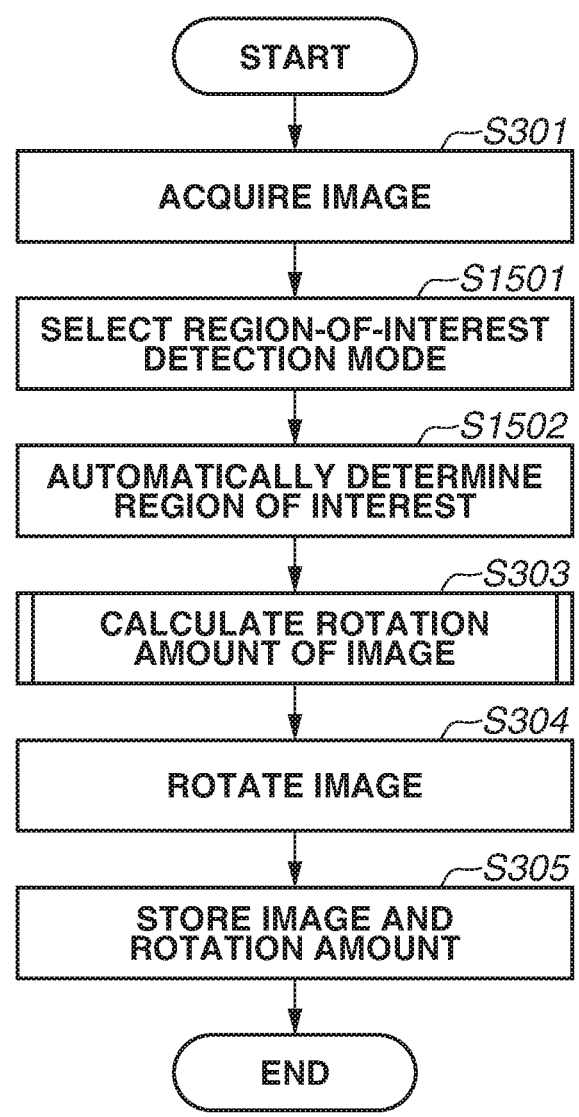
FIG. 15 is a flowchart illustrating a flow of processing in the image processing apparatus according to the third exemplary embodiment.

FIG. 14 is a block diagram illustrating a logical configuration of an image processing apparatus according to the third exemplary embodiment. Moreover, FIG. 15 is a flowchart illustrating processing which is performed by constituent elements illustrated in FIG. 14. The CPU 101 functions as constituent elements illustrated in FIG. 14 by reading out a program stored in the ROM 103 or the HDD 105 to implement the flowchart of FIG. 15 and executing the program while using the RAM 102 as a work area.

In step S1501, a detection mode selection unit 1401 selects a mode for determining a method of detecting a region of interest from an image. The detection mode is a mode of specifying a feature which is to be set as a region of interest in an input omnidirectional image. Here, examples of the detection mode are assumed to include a person mode, which detects the face of a person, and a pet mode, which detects a pet animal. The user is allowed to select any one of the person mode and the pet mode. The detection mode selection unit 1401 outputs the designated mode to a region-of-interest determination unit 1402. The detection mode can be configured to include another mode for selection, such as a statistic mode, which uses statistical information for detection, an image capturing occasion emphasis mode, which uses information obtained at the time of image capturing, or a landscape mode, which detects a region having high frequencies. Moreover, in the present exemplary embodiment, a default detection mode which is to be used in a case where no region of interest is detected in the designated detection mode is also set.

In step S1502, the region-of-interest determination unit 1402 automatically determines a region of interest from the input image data based on the detection mode output from the detection mode selection unit 1401. In a case where the detection mode is the person mode, the region-of-interest determination unit 1402 performs face detection processing on the input image data, and sets the detected face region as a region of interest. In a case where the detection mode is the pet mode, the region-of-interest determination unit 1402 performs animal detection processing on the input image data, and sets the detected animal region as a region of interest. In a case where no region of interest is detected, the region-of-interest determination unit 1402 performs detection using the default detection mode. Here, the landscape mode is set as the default detection mode. In the landscape mode, the region-of-interest determination unit 1402 divides an input omnidirectional image into a plurality of regions, calculates frequencies in the respective regions, and sets a region having a larger number of high-frequency components as a region of interest. The region-of-interest determination unit 1402 sets the barycentric position of the region detected in an omnidirectional image as a point of interest $(x_i, y_i)$.

In the above-described way, the image processing in the third exemplary embodiment is completed. According to the present exemplary embodiment, a region of interest can be automatically designated based on the detection mode, so that a subject of interest can be stored at high resolution in conformity with a scene.

In the above-described exemplary embodiments, a region of interest desired to be stored at high resolution is specified, and an omnidirectional image is generated in such a manner that the region of interest is equivalent to a position near a pole. As mentioned above, in a planar image obtained by projection in equidistant cylindrical projection, a region near the equator has the lowest resolution. Therefore, from among subjects in an omnidirectional image, a region of non-interest, such as the ground, the floor, or the sky, can be specified, and an omnidirectional image can be generated in such a manner that the region of non-interest is preferentially equivalent to the region near the equator. This is nothing else that generating an omnidirectional image in such a manner that a region of non-interest is not equivalent to a position having a high resolution means indirectly specifying a region of interest desired to be stored at a position having a high resolution.

The disclosure can also be implemented by processing for supplying a program for implementing one or more functions of the above-described exemplary embodiments to a system or apparatus via a network or a storage medium and causing one or more processors included in a computer of the system or apparatus to read out and execute the program. Moreover, the disclosure can also be implemented by a circuit which implements one or more functions (for example, an application specific integrated circuit (ASIC)).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-128956, filed Jun. 30, 2017, and No. 2018-076383, filed Apr. 11, 2018, which are hereby incorporated by reference herein in their entirety.

What is claimed is:

1. An image processing apparatus comprising:
   an acquisition unit configured to acquire input image data used to represent an image;
   a determination unit configured to determine a region of interest in the input image data; and
   a conversion unit comprising:
   a calculation unit configured to calculate a rotation amount of a point of interest representative of the region of interest in the spherical coordinate system in such a manner that coordinates of the point of interest come close to an upper portion or lower portion of the output image data; and
   a rotation processing unit configured to rotate the input image data according to the rotation amount to convert the input image data into output image data representing at least a part of the image in equidistant cylindrical projection.

2. The image processing apparatus according to claim 1, wherein the conversion unit converts the input image data into the output image data in such a manner that, when the output image data is mapped onto a sphere, the region of interest is equivalent to a position near a pole of the sphere.

3. The image processing apparatus according to claim 1,
   wherein each of the input image data and the output image data represents an omnidirectional image, and
   wherein the omnidirectional image represented by the output image data is an image obtained by changing a position of a subject in the omnidirectional image represented by the input image data.

4. The image processing apparatus according to claim 1, wherein the conversion unit converts a position of a point of interest representing the region of interest in an image represented by the input image data.

5. The image processing apparatus according to claim 1, wherein, in a case where the determination unit designates two regions of interest as the region of interest, the conversion unit converts the input image data into the output image data according to an angular difference between two lines from a common origin connecting two points of interest representing the two respective regions of interest.

6. The image processing apparatus according to claim 5, wherein the conversion unit converts the input image data into the output image data in such a manner that, in a case where the angular difference between the two regions of interest is equal to or greater than 90 degrees, the two regions of interest come close to positions of respective different poles and, in a case where the angular difference between the two regions of interest is less than 90 degrees, the two regions of interest come close to positions of the same pole.

7. The image processing apparatus according to claim 5, wherein, in a case where the determination unit designates three or more regions of interest as the region of interest, the conversion unit classifies the regions of interest into two groups according to positions of the regions of interest.

8. The image processing apparatus according to claim 1, wherein the acquisition unit acquires one piece of input image data representing a spherical image, and wherein the conversion unit obtains the output image data by rotating the input image data acquired by the acquisition unit in a spherical coordinate system.

9. The image processing apparatus according to claim 1, further comprising a selection unit configured to select a detection mode for determining the region of interest, wherein the determination unit automatically detects a plurality of regions of interest based on the detection mode.

10. The image processing apparatus according to claim 9, wherein, in a case where the region of interest is not detected in the detection mode selected by the selection unit, the determination unit detects a region of interest using a previously-set detection mode.

11. The image processing apparatus according to claim 9, wherein the selection unit includes a person mode for detecting a person and setting at least one of detected persons as the region of interest.

12. The image processing apparatus according to claim 9, wherein the selection unit divides the input image data into a plurality of regions, calculates frequencies at the respective regions, and sets a region having a larger number of high-frequency components as the region of interest.

13. The image processing apparatus according to claim 1, wherein the determination unit determines a point of interest representing the region of interest according to a designation from a user.

14. The image processing apparatus according to claim 1, wherein the input image data is a plurality of captured images with respective different points of view, and the conversion unit generates the output image data from the plurality of captured images.

15. The image processing apparatus according to claim 14, further comprising:
an orientation acquisition unit configured to acquire orientation information indicating respective orientations of a camera used to capture the plurality of captured images; and
a synthesis unit configured to synthesize an omnidirectional image from the plurality of captured images based on the orientation information,
wherein the conversion unit converts the omnidirectional image synthesized by the synthesis unit into the output image data.

16. The image processing apparatus according to claim 1, wherein each of the input image data and the output image data is an omnidirectional image retaining information about light rays in all directions from a given point of view.

17. An image processing apparatus comprising:
an acquisition unit configured to acquire input image data used to represent an image;
a determination unit configured to determine a region of interest in the input image data; and
a conversion unit configured to convert, based on the region of interest, the input image data into output image data representing at least a part of the image in equidistant cylindrical projection,
wherein the conversion unit converts the input image data so that the region of interest locates near the top or bottom in the output image data, and
wherein, in a planar image represented by the output image data, a resolution of pixels located near an uppermost portion and lowermost portion is higher than a resolution of pixels located near a center horizontal line, and the conversion unit performs conversion in such a manner that the region of interest is located near the uppermost portion or lowermost portion in the planar image.

18. An image processing method comprising:
acquiring input image data used to represent one or more pieces of input image data containing objects in a scene;
determining a region of interest in the input image data; and
converting comprising:
calculating a rotation amount of a point of interest representative of the region of interest in the spherical coordinate system in such a manner that coordinates of the point of interest come close to an upper portion or lower portion of the output image data, and
rotating the input image data according to the rotation amount to convert the input image data into output image data representing at least a part of the image in equidistant cylindrical projection.

19. A non-transitory computer-readable storage medium storing computer-executable instructions that, when executed by a computer, cause the computer to perform an image processing method comprising:
acquiring input image data used to represent one or more pieces of input image data containing objects in a scene;
determining a region of interest in the input image data; and
converting comprising:
calculating a rotation amount of a point of interest representative of the region of interest in the spherical coordinate system in such a manner that coordinates of the point of interest come close to an upper portion or lower portion of the output image data, and
rotating the input image data according to the rotation amount to convert the input image data into output image data representing at least a part of the image in equidistant cylindrical projection.

20. An image processing method comprising:
acquiring input image data used to represent an image;
determining a region of interest in the input image data; and
converting, based on the region of interest, the input image data into output image data representing at least a part of the image in equidistant cylindrical projection,
wherein converting comprises converting the input image data so that the region of interest locates near the top or bottom in the output image data, and
wherein, in a planar image represented by the output image data, a resolution of pixels located near an uppermost portion and lowermost portion is higher than a resolution of pixels located near a center horizontal line, and converting comprises performing conversion in such a manner that the region of interest is located near the uppermost portion or lowermost portion in the planar image.

* * * * *